(12) United States Patent
Makwarth et al.

(10) Patent No.: US 11,240,126 B2
(45) Date of Patent: Feb. 1, 2022

(54) DISTRIBUTED TRACING FOR APPLICATION PERFORMANCE MONITORING

(71) Applicant: Elasticsearch B.V., Mountain View, CA (US)

(72) Inventors: Rasmus Makwarth, Copenhagen (DK); Ron Cohen, Copenhagen (DK)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 16/381,997

(22) Filed: Apr. 11, 2019

(65) Prior Publication Data
US 2020/0328952 A1  Oct. 15, 2020

(51) Int. Cl.
*H04L 12/24* (2006.01)
*H04L 29/08* (2006.01)

(52) U.S. Cl.
CPC .......... *H04L 41/5096* (2013.01); *H04L 41/22* (2013.01); *H04L 67/025* (2013.01)

(58) Field of Classification Search
CPC ... H04L 41/5096; H04L 67/025; H04L 41/22; H04L 41/5009; H04L 41/5051
See application file for complete search history.

(56) References Cited

U.S. PATENT DOCUMENTS

| | | |
|---|---|---|
| 8,412,237 B1 | 4/2013 | Ohme |
| 8,683,490 B2 | 3/2014 | Endrikhovski et al. |
| 9,432,379 B1 | 8/2016 | Roche et al. |
| 10,109,086 B1 | 10/2018 | Bakshi et al. |
| 10,756,959 B1 | 8/2020 | Makwarth et al. |
| 10,782,860 B2 | 9/2020 | Neirynck |
| 2004/0054723 A1 | 3/2004 | Dayal et al. |
| 2004/0267600 A1 | 12/2004 | Horvitz |
| 2005/0216865 A1 | 9/2005 | Rollin et al. |
| 2006/0117390 A1 | 6/2006 | Shrivastava et al. |
| 2006/0224989 A1 | 10/2006 | Pettiross et al. |

(Continued)

OTHER PUBLICATIONS

Title: Application Performance Monitoring in Microservice-Based Systems Author: Valentin Seifermann Publisher: University of Stuttgart (Year: 2017).*

(Continued)

*Primary Examiner* — Ario Etienne
*Assistant Examiner* — Kamal Hossain
(74) *Attorney, Agent, or Firm* — Carr & Ferrell LLP

(57) ABSTRACT

Methods and systems for providing distributed tracing for application performance monitoring utilizing a distributed search engine in a microservices architecture. An example method comprises providing a user interface (UI) including a distributed trace indicating in real time the services invoked to serve an incoming HTTP request, the UI further including, in a single view, associated execution times for the services shown as a timeline waterfall. The distributed trace automatically propagates a trace ID to link services end-to-end in real time until a response to the request is served. The single view also provides graphs of response time information and the distribution of response times for the services. In response to selection of a particular element of the distribution, the UI provides respective timing details. The graphs and data shown on the single view can be filtered based on metadata input into a search field of the single view.

22 Claims, 11 Drawing Sheets

(56) References Cited

U.S. PATENT DOCUMENTS

| | | |
|---|---|---|
| 2007/0124374 A1 | 5/2007 | Arun et al. |
| 2007/0226204 A1 | 9/2007 | Feldman |
| 2008/0120565 A1 | 5/2008 | Stiso et al. |
| 2008/0243766 A1 | 10/2008 | Nowlan et al. |
| 2009/0027418 A1 | 1/2009 | Maru et al. |
| 2009/0175509 A1 | 7/2009 | Gonion et al. |
| 2011/0023082 A1 | 1/2011 | Narasinghanallur et al. |
| 2011/0153186 A1 | 6/2011 | Jakobson |
| 2011/0208766 A1 | 8/2011 | Lang |
| 2011/0261049 A1 | 10/2011 | Cardno et al. |
| 2013/0127877 A1 | 5/2013 | Blas, Jr. et al. |
| 2013/0254699 A1 | 9/2013 | Bashir et al. |
| 2013/0346367 A1 | 12/2013 | Trugman et al. |
| 2014/0082093 A1 | 3/2014 | Savage |
| 2014/0109193 A1 | 4/2014 | Desai et al. |
| 2014/0125672 A1 | 5/2014 | Winternitz et al. |
| 2014/0181222 A1 | 6/2014 | Geris et al. |
| 2014/0215443 A1* | 7/2014 | Voccio ................ G06F 11/3688 717/128 |
| 2014/0250234 A1 | 9/2014 | Liesche et al. |
| 2014/0365511 A1 | 12/2014 | Burrows et al. |
| 2014/0379648 A1 | 12/2014 | Chiu |
| 2014/0380237 A1 | 12/2014 | Kroupa et al. |
| 2015/0007252 A1 | 1/2015 | Kazachkov et al. |
| 2015/0009234 A1 | 1/2015 | Johnson et al. |
| 2015/0026208 A1 | 1/2015 | Kuhmuench |
| 2015/0070351 A1 | 3/2015 | Tarquini et al. |
| 2015/0127637 A1 | 5/2015 | Cavanagh et al. |
| 2015/0220594 A1 | 8/2015 | Leyba |
| 2015/0269499 A1 | 9/2015 | B et al. |
| 2015/0363733 A1 | 12/2015 | Brown |
| 2015/0370839 A1* | 12/2015 | Bareket ................ G06F 16/1827 707/741 |
| 2016/0011751 A1 | 1/2016 | Moses et al. |
| 2016/0057159 A1 | 2/2016 | Yin et al. |
| 2016/0182328 A1* | 6/2016 | Bhasin ................ H04L 43/067 709/224 |
| 2016/0188663 A1 | 6/2016 | Tsumura et al. |
| 2016/0283085 A1 | 9/2016 | Beausoleil et al. |
| 2017/0075919 A1 | 3/2017 | Bose et al. |
| 2017/0147790 A1 | 5/2017 | Patel et al. |
| 2017/0169611 A1 | 6/2017 | Ramirez Flores et al. |
| 2017/0295018 A1 | 10/2017 | Whitehouse |
| 2017/0346862 A1 | 11/2017 | Hanhirova |
| 2017/0359346 A1 | 12/2017 | Parab et al. |
| 2018/0060361 A1 | 3/2018 | Beveridge |
| 2018/0062955 A1* | 3/2018 | Broda ................ H04L 61/1511 |
| 2018/0113891 A1 | 4/2018 | Jaskiewicz et al. |
| 2018/0121082 A1 | 5/2018 | Zhu et al. |
| 2018/0150384 A1* | 5/2018 | Alaranta ................ G06F 16/22 |
| 2018/0232194 A1 | 8/2018 | Chen |
| 2018/0239658 A1 | 8/2018 | Whitner et al. |
| 2018/0270122 A1* | 9/2018 | Brown ................ H04L 69/40 |
| 2018/0276266 A1 | 9/2018 | Diwakar |
| 2018/0287856 A1 | 10/2018 | Whitner et al. |
| 2019/0020659 A1 | 1/2019 | Loni et al. |
| 2019/0057534 A1 | 2/2019 | Henry et al. |
| 2019/0138995 A1 | 5/2019 | Currin et al. |
| 2019/0229922 A1 | 7/2019 | Galloway |
| 2019/0272085 A1 | 9/2019 | Radhakrishnan Lakshmi |
| 2019/0317754 A1 | 10/2019 | Mosquera et al. |
| 2019/0354835 A1 | 11/2019 | Mac et al. |
| 2019/0377887 A1 | 12/2019 | Bedi et al. |
| 2020/0021505 A1* | 1/2020 | Vinnakota ................ H04L 43/04 |
| 2020/0036522 A1 | 1/2020 | Willnauer |
| 2020/0073785 A1* | 3/2020 | Alaranta ................ G06F 11/3476 |
| 2020/0134750 A1 | 4/2020 | Wolf et al. |
| 2020/0202020 A1 | 6/2020 | Ewing |
| 2020/0272307 A1 | 8/2020 | Neirynck |
| 2020/0296110 A1 | 9/2020 | Kobel et al. |
| 2021/0124478 A1 | 4/2021 | Reese et al. |

OTHER PUBLICATIONS

Grand, Adrien, "Document-Level Attribute-Based Access Control," U.S. Appl. No. 16/212,475, filed Dec. 6, 2018, Specification, Claims, Abstract, and Drawings, 37 pages.

Ewing, Courtney, "Methods and Systems for Access Controlled Spaces for Data Analytics and Visualization," U.S. Appl. No. 16/226,138, filed Dec. 19, 2018, Specification, Claims, Abstract, and Drawings, 47 pages.

Willnauer, Simon Daniel, "Default Password Removal," U.S. Appl. No. 16/047,959, filed Jul. 27, 2018, Specification, Claims, Abstract, and Drawings, 37 pages.

Hinterreiter, Daniel, "Supporting feature-oriented development and evolution in industrial software ecosystems", Proceedings of the 22nd International Systems and Software Product Line Conference- vol. 2, Sep. 10-14, 2018, 8 pages.

Kuhlmann, Mirco et al., "Comprehensive Two-level Analysis of Static and Dynamic RBAC Constraints with UML and OCL", 2011 Fifth International Conference on Secure Software Integration and Reliability Improvement, pp. 108-117. IEEE, 2011, 10 pages.

* cited by examiner

600 traceparent:
00-
0af7651916cd43dd8448eb211c80319c-    // version
b7ad6b7169203331-                     // trace id
01                                    // parent span id
                                      // flags (sampling)

```
┌─────────────────────────────────────────────────┐
│  Providing a user interface (UI) including a distributed │
│  trace indicating in real time a plurality of services invoked │
│  to serve an incoming request, the UI further including │
│  associated execution times for the plurality of services, │
│  the distributed trace linking in real time each of the │
│  plurality of services to one another over time. │
│                       702                       │
└─────────────────────────────────────────────────┘
                         │
                         ▼
┌─────────────────────────────────────────────────┐
│  Further providing in the UI one or more spans over time │
│  for each of the plurality of services, the spans including │
│  information about a particular code path executed for the │
│  respective one of the plurality of services. │
│                       704                       │
└─────────────────────────────────────────────────┘
                         │
                         ▼
┌─────────────────────────────────────────────────┐
│  Providing in the user interface response time information │
│  associated with the distributed trace for serving the │
│  request.                                       │
│                       706                       │
└─────────────────────────────────────────────────┘
```

FIG. 7

DISTRIBUTED TRACING FOR APPLICATION PERFORMANCE MONITORING

FIELD

The present technology pertains in general to performance monitoring and visualization and more specifically, to providing distributed tracing data visualization and analysis for application performance monitoring in a distributed, multi-tenant-capable full-text analytics and search engine environment.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

The present disclosure provides various embodiments of systems and methods for providing distributed tracing data visualization and analysis to enable robust application performance monitoring in a microservice-based architecture involving a distributed, multitenant-capable analytics and search engine environment. In this environment, requested transactions can be linked together into a trace which includes an end-to-end user interface view of performance of how the request was served across microservices through the entire infrastructure. Microservices are also referred to as services herein. Traces can group together events that originated from the same request. Various embodiments provide a user interface which shows a distributed trace of all the components which took part in the transaction. Furthermore, various embodiments provide the user interface which string transactions together with a distributed trace in specific ways, integrated with ELASTICSEARCH or another analysis search engine, that enable navigating individual transactions for the various microservices to contextualize the performance of individual transactions and thereby quickly pinpoint bottlenecks of the end-user experience. In this regard, users can use the distributed tracing user interface to readily identify where latency and other issues are arising in the path and then pinpoint the components that need optimizing or other adjustments to eliminate performance issues.

Various embodiments provide a computer-implemented method for providing distributed tracing for application performance monitoring in a microservices architecture. An exemplary computer-implemented method includes providing a user interface including a distributed trace indicating in real time a plurality of services invoked to serve an incoming request, the user interface further including associated execution times for the plurality of services, the distributed trace linking in real time each of the plurality of services to one another over time; further providing in the user interface one or more spans over time for each of the plurality of services, the spans including information about a particular code path executed for the respective one of the plurality of services; and providing in the user interface response time information associated with the distributed trace for serving the request.

In various embodiments, a system is provided including a processor and a memory communicatively coupled to the processor, the memory storing instructions executable by the processor to perform a method comprising receiving an incoming request; providing a user interface including a distributed trace indicating in real time a plurality of services invoked to serve the incoming request, the user interface further including associated execution times for the plurality of services, the distributed trace linking in real time each of the plurality of services to one another over time; further providing in the user interface one or more spans over time for each of the plurality of services, the spans including information about a particular code path executed for the respective one of the plurality of services; and providing in the user interface response times information associated with the distributed trace for serving the request.

In some embodiments, a system is provided including a processor and a memory communicatively coupled to the processor, the memory storing instructions executable by the processor to perform a method comprising providing a user interface including a distributed trace indicating in real time a plurality of services invoked to serve an incoming request, the user interface further including associated execution times for the plurality of services, the distributed trace linking in real time each of the plurality of services to one another over time; further providing in the user interface one or more spans over time for each of the plurality of services, the spans including information about a particular code path executed for the respective one of the plurality of services; and providing in the user interface response times information associated with the distributed trace for serving the request.

BRIEF DESCRIPTION OF THE DRAWINGS

Embodiments are illustrated by way of example, and not by limitation, in the figures of the accompanying drawings, in which like references indicate similar elements and in which:

FIG. 6 illustrates version, trace ID, parent span ID, and flags (sampling) where the trace ID may be standardized, according to an example embodiment.

FIG. 7 is a flow diagram of a method, according to an example embodiment.

DETAILED DESCRIPTION

Figure 1:
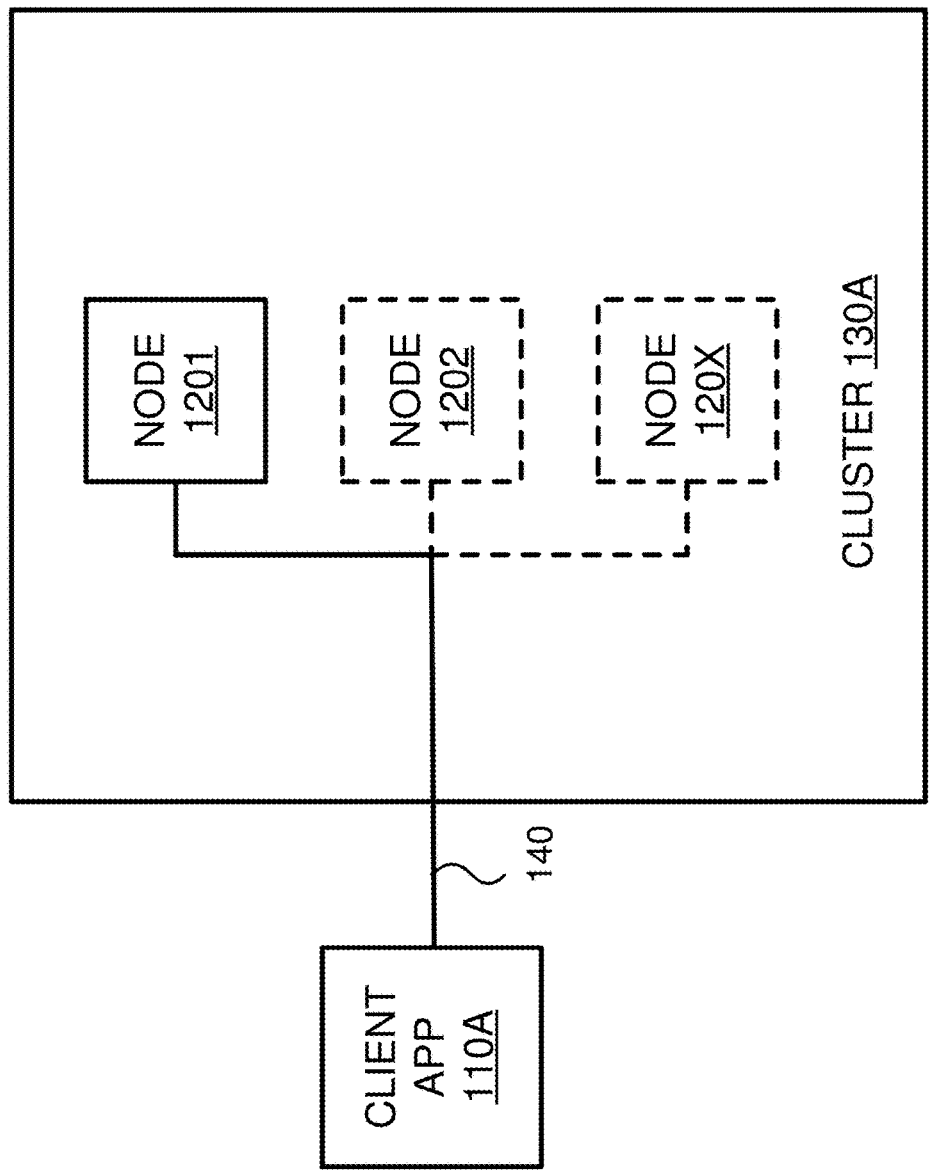
FIG. 1 is a simplified block diagram of a system having a distributed application structure, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present disclosure is related to various embodiments of systems and methods for providing distributed tracing data visualization and analysis for application performance monitoring in a distributed, multitenant-capable full-text analytics and search engine environment.

Figure 2:
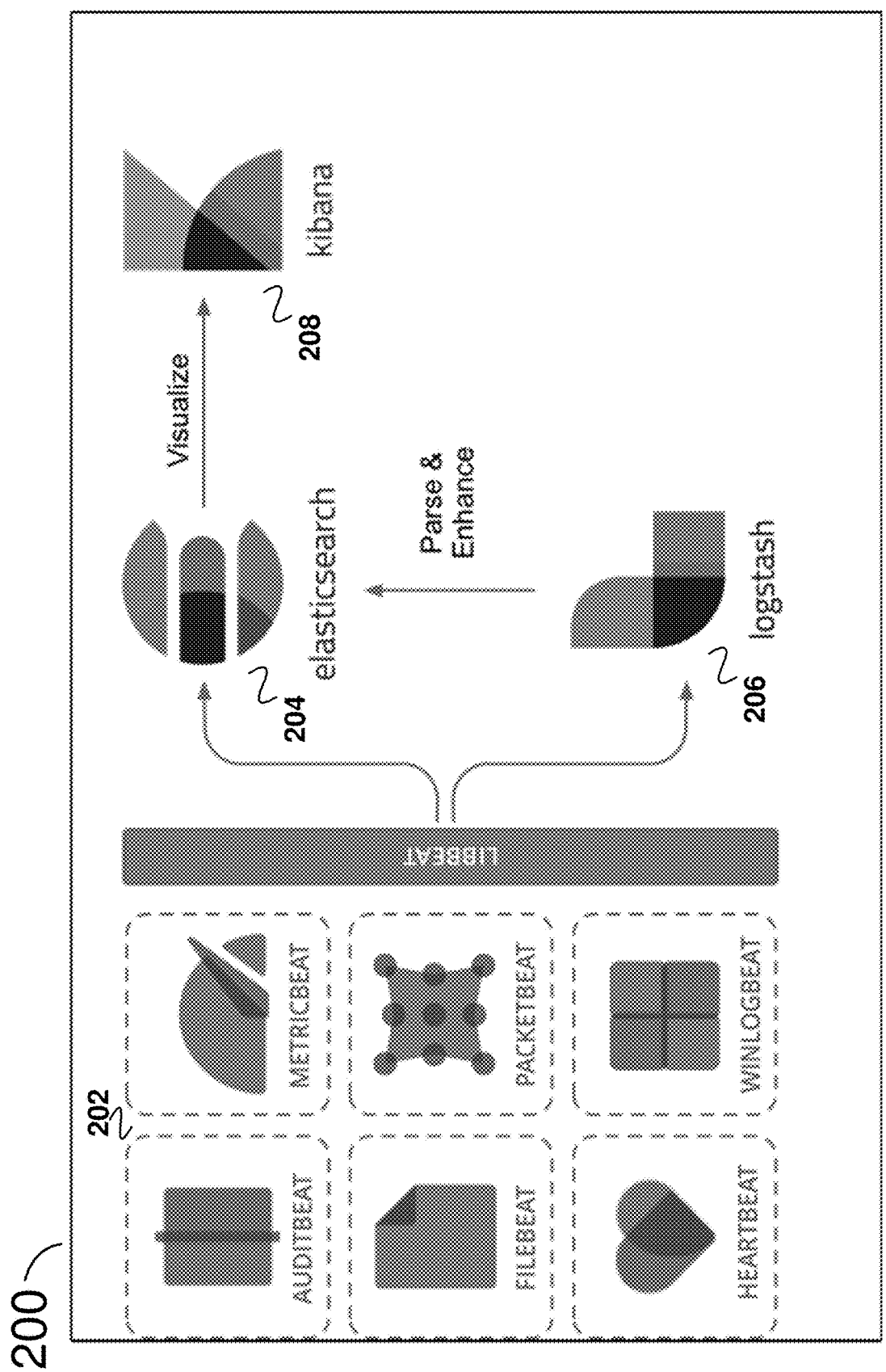
FIG. 2 is an example overall diagram illustrating various aspects and process flow, according to example embodiments.
Figure 3:
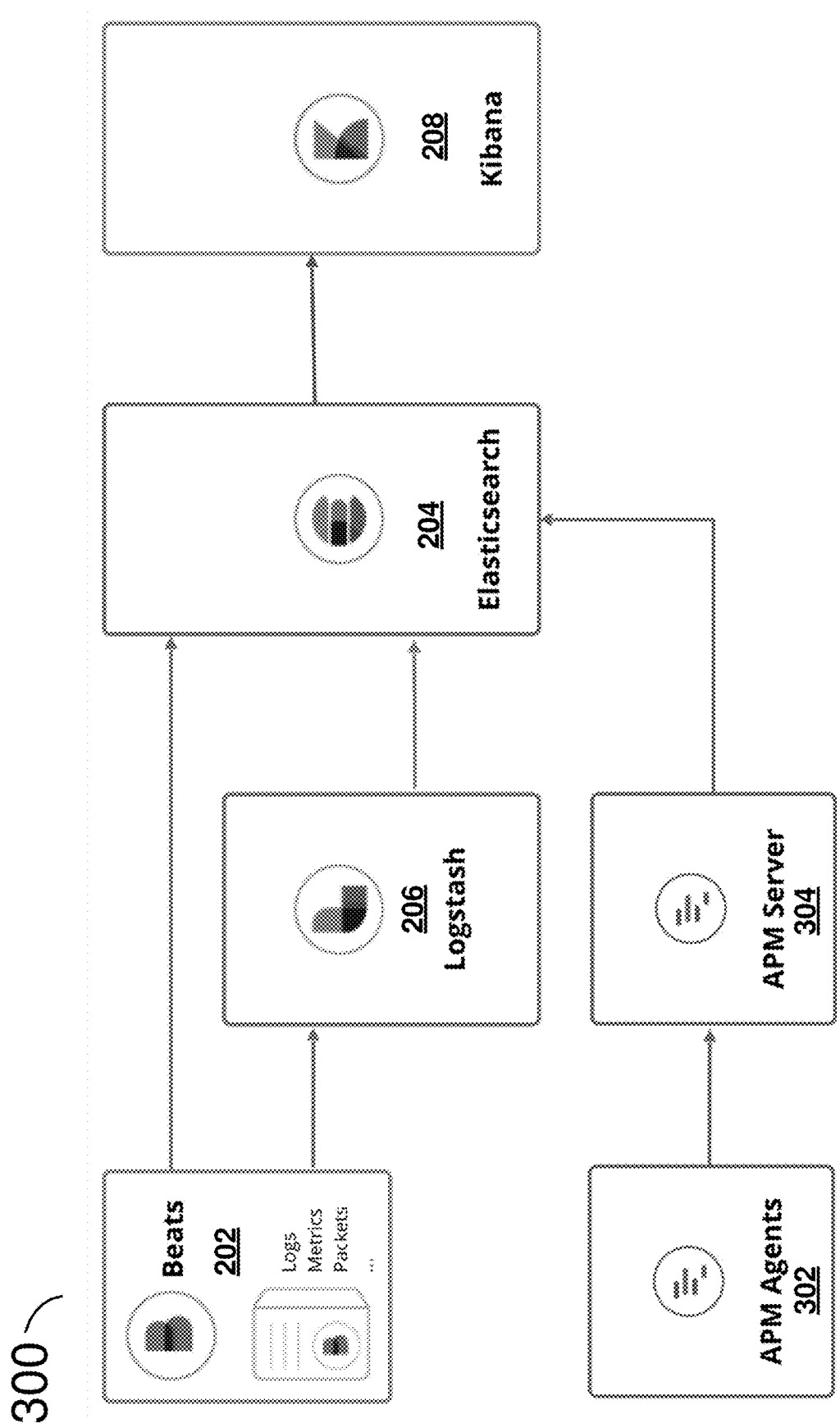
FIG. 3 is an example overall diagram showing various application performance monitoring (APM) aspects within the environment in the example in FIG. 2, according to some embodiments.

FIGS. 1-3 provide an overview of an example overall system and some aspects and components that may be used for some embodiments.

FIG. 1 is a simplified diagram illustrating a system 100 to illustrate certain concepts of the distributed nature and distributed application structure, according to some embodiments. System 100 includes client application 110A, one or more nodes 1201-120X, and connections 140. Collectively, one or more nodes 1201-120X form cluster 130A. When only one node (e.g., node 1201) is running, then cluster 130A is just one node. In various embodiments, a cluster (e.g., cluster 130A) is a collection of one or more nodes (servers) (e.g., one or more nodes 1201-120X) that together store data and provides federated indexing and search capabilities across all nodes. A cluster can be identified by a unique name, such that a node can be part of a cluster when the node is set up to join the cluster by its name. A cluster may have only one node in it. In some embodiments, a node (e.g., one or more nodes 1201-120X) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup. Any number of nodes can be in a single cluster. In some embodiments, nodes (e.g., one or more nodes 1201-120X) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client 110A) requests to the appropriate node. Each node can serve one or more purposes, master node and data node.

Each of client application 110A and one or more nodes 1201-120X can be a container, physical computing system, virtual machine, and the like. Generally, client application 110A can run on the same or different physical computing system, virtual machine, container, and the like as each of one or more nodes 1201-120X. Each of one or more nodes 1201-120X can run on the same or different physical computing system, virtual machine, container, and the like as the others of one or more nodes 1201-120X. A physical computing system is described further in relation to the exemplary computer system 800 of FIG. 8. Virtual machines may provide a substitute for a physical computing system and the functionality needed to execute entire operating systems.

When client application 110A runs on a different physical server from a node (e.g., of one or more nodes 1201-120X), connections 140 can be a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). When a node (of one or more nodes 1201-120X) runs on a different physical computing system from another node (of one or more nodes 1201-120X), connections 140 can be a data communications network. Further details regarding the distributed application structure can be found in commonly assigned U.S. patent application Ser. No. 16/047,959, filed Jul. 27, 2018 and incorporated by reference herein.

Having provided the above details of certain concepts of the distributed application structure described above, the description now turns to further detailing aspects of the present technology according to various embodiments.

Although various example embodiments are described herein with respect to KIBANA and other elements of an integration solution called ELASTIC STACK, the present technology is not so limited.

KIBANA provides for data visualization and exploration, for example, for log and time-series data analytics, application monitoring, and other use cases regarding a user's data on its servers, cloud-based services used, etc.

FIG. 2 is an example diagram of a system 200 illustrating KIBANA connections and flow with respect to other aspects of an integrated solution referred to as ELASTIC STACK. BEATS 202 can capture various items including but not limited to audit data (AUDITBEAT), log files (FILEBEAT), availability (HEARTBEAT), metrics (METRICBEAT), network traffic (PACKETBEAT), and windows event logs (WINLOGBEAT). Although each of those is shown in FIG. 2, BEATS need not include all of those elements in this example. BEATS can send data directly into ELASTICSEARCH 204 or via LOGSTASH 206 (a data-collection and log-parsing engine) where it can be further processed and enhanced before visualizing, analyzing and exploring it using KIBANA 208). Although FIG. 2 includes KIBANA 208 and other particular aspects and components, the present technology is not limited to utilizing some or all of the components and aspects.

KIBANA 208 can provide a powerful and easy-to-use visual interface with features such as histograms, line graphs, pie charts, sunbursts and the can enable a user to design their own visualization, e.g., leveraging the full aggregation capabilities of the ELASTICSEARCH 204 (a distributed, multitenant-capable full-text analytics and search engine). In that regard, KIBANA 208 can provide tight integration with ELASTICSEARCH 204 for visualizing data stored in ELASTICSEARCH 204. KIBANA 208 may also leverage the Elastic Maps Service to visualize geospatial data, or get creative and visualize custom location data on a schematic of the user's choosing. Regarding time series data, KIBANA 208 can also perform advanced time series analysis on a company or other user's ELASTICSEARCH 204 data with provide curated time series user interfaces (UI)s. Queries, transformations, and visualizations can be described with powerful, easy-to-learn expressions. Relationships can be analyzed with graph exploration.

With KIBANA 208, a user may take the relevance capabilities of a search engine, combine them with graph exploration, and uncover the uncommonly common relationships in the user's ELASTICSEARCH 204 data. In addition, KIBANA 208 can enable a user to detect the anomalies hiding in a user's ELASTICSEARCH 204 data and explore the properties that significantly influence them with unsupervised machine learning features. A user could also, e.g., using CANVAS, infuse their style and creativity into presenting the story of their data, including live data, with the logos, colors, and design elements that make their brand unique. This covers just an exemplary subset of the capabilities of KIBANA 208.

It can be provided for the user to share visualizations and dashboards (e.g., KIBANA 208 or other visualizations and dashboards) within a space or spaces (e.g., using KIBANA SPACES), with others, e.g., a user's team members, the user's boss, their boss, a user's customers, compliance managers, contractors, while having access controlled.

FIG. 3 is an example overall diagram 300 showing various application performance monitoring (APM) aspects within the environment in the example in FIG. 2, according to some embodiments. In the example in FIG. 3, a plurality of APM agents 302 are included. In various embodiments, the APM agents are open source libraries written in the same language as a user's service. A user may install APM agents 302 into their service as the user would install any other library. The APM agents 302 can instrument a user's code and collect performance data and errors at runtime. In various embodiments, the collected performance data and errors (also referred to collectively as collected data or just data) is buffered for a short period and sent on to APM Server 304. In some embodiments, the APM Server 304 is an open source application which typically runs on dedicated servers. The APM Server 304 may receive the collected data from the APM agents 302 through an application programming interface (API). In some embodiments, the APM Server 304 creates documents from the collected data from the APM agents 302 and store the documents in the full-text search and analytics engine, e.g., ELASTICSEARCH 204 in this example. ELASTICSEARCH 204 can allow the user to store, search, and analyze big volumes of data quickly and in near real time. The documents can include APM performance metrics. As further described herein, KIBANA 208 is an open source analytics and visualization platform designed to work with ELASTICSEARCH 204. KIBANA 208 may be used to search, view, and interact with data stored in ELASTICSEARCH 204. KIBANA 208 may also be used to visualize APM data by utilizing the APM UI.

In various embodiments, the APM agents 302 capture different types of information from within their instrumented applications, known as events. The events may be errors, spans, or transactions. These events may be then streamed to the APM Server 304 which validates and processes the events.

Historically, software applications have been monolithic in that the code was contained within a single application. Modern architectures often include multiple services and multiple applications that talk to each other. This is also referred to as a microservice architecture. Microservices are also referred to herein shortened to services for conciseness. Applications and services may also be referred to herein as just services for conciseness.

As part of serving a web request on a particular website there might be, for example, several of services invoked. There could be two or dozens of services invoked for one request. A web request is also referred to herein as a request or an HTTP request. Part of serving a particular request could involve queries made to back-end services such as to www.google.com, and while waiting for response in a browser, the GOOGLE back-end is getting requests through several services, which could also delay getting a response to the particular request. In various embodiments, distributed tracing allows a user (such as a developer and the like) to follow a request as it comes in and how it automatically propagates through the services. In various embodiments, user can see a visualization of how long the entire request took to be served. A user may also see, on a per service level, the location of the biggest bottlenecks as part of serving that particular request. The bottlenecks can be related to time and resources used, to name a few. Without distributed tracing with a distributed, multitenant-capable full-text analytics and search engine environment, developers and other users would have to manually determine a first service involved, look into that first service to determine manually what other services are involved and manually call up various metrics, etc. to try to identify a bottleneck; a very time consuming process and sometimes impossible to do for servicing complex requests, for instance. A complex request may invoke hundreds of services, making the aforementioned manual process impossible to perform in the timely manner.

In assessing a bottleneck in processing a request, it is key to identify which services are involved, trace each one, and narrow down which service(s) are the problem, and then delve even more granularly within the service. In various embodiments, instrumentation is also provided on a service level which provides a granular view of exactly what a particular service was spending its time on. Various embodiments essentially trace all of the time consuming tasks that a certain service is doing when performing a response to a request. So within the scope of that one service, methods and systems according to various embodiments provide a very granular view of where time was spent. In addition to this granular breakdown, various embodiments can also provide the user with the duration that each service was occupying as part of the entire trace. Thus, both the granular level within a service, and the duration of each service, are some of the aspects provided in various embodiments. For example, the method enables the user to visualize which part (e.g., service) of a trace was slowest in terms of the dynamics of the services and why that part (e.g., service) was so slow.

The distributed tracing in various embodiments is structured to function in particular environments and enables a user to analyze performance throughout their microservices architecture all in one view, with that environment. Transactions and spans can form the trace. Traces can group together events that have a common root.

Figure 4:
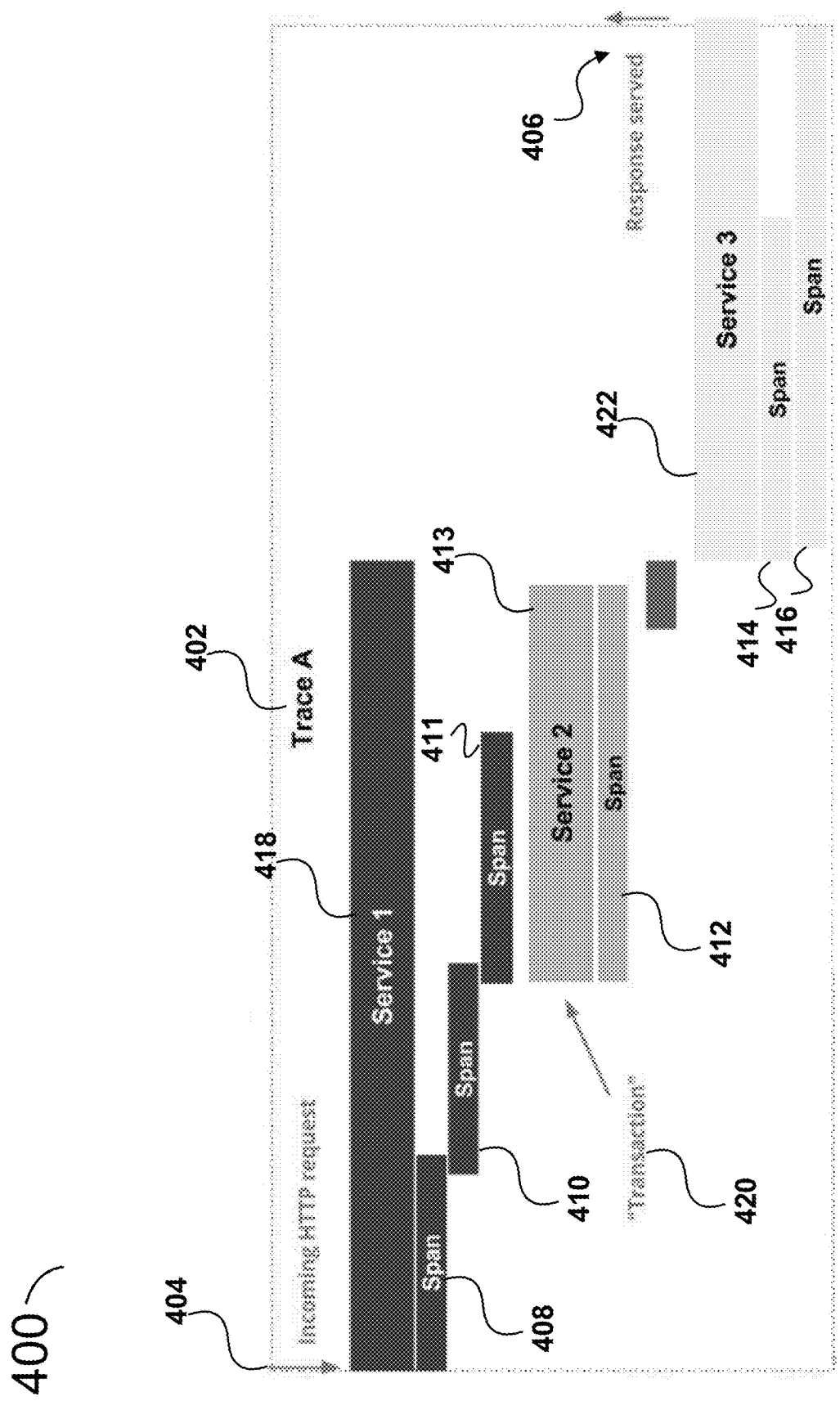
FIG. 4 is an example illustrating a distributed trace from an incoming HTTP request to the response being serviced, according to some embodiments.

FIG. 4 is an example high level diagram 400 illustrating various components of a distributed trace 402 (Trace A) from an incoming HTTP request, at 404, to the response being served, at 406, and spans 408, 410, 411, 412, 414, and 416 within the distributed trace 402. In this example, in response to receipt of the incoming HTTP request, at 404, a front-end service 418 (service 1) is invoked initially. Three spans, 408, 410, and 411 are shown for service 1 (418) until a transaction 420 occurs.

In various embodiments, transactions are a special kind of span that have additional attributes associated with them. The transactions can describe an event captured by an APM agent instrumenting a service. Transactions are in essence the highest level of work being measured within a service, according to various embodiments. A transaction might be, for example, a request to a server, a batch job, a background job, or some other type of transaction. The APM agents 302 can decide whether to sample transactions or not, and provide settings to control sampling behavior. If sampled, the spans of a transaction may be sent and stored as separate documents. Within one transaction there can be none, one or many spans captured. A transaction may contain in some embodiments: the timestamp of the event; a unique ID, type, and name; data about the environment in which the event is recorded such as service (environment, framework, language, etc.), host (architecture, hostname, IP, etc.), process (args, process ID (PID), parent's process ID (PPID), etc.), URL (full, domain, port, query, etc.), user (if supplied, email, ID, username, etc.); and other relevant information depending on the APM agent.

For the transaction 420 in the example in FIG. 4, a service 2 (413) has a span 412. The service 2 (413) may call a service 3, identified also as 422, which has associated spans 414 and 416.

The spans may contain information about a specific code path that has been executed. The span measure from the start to end of a certain activity, and can have a parent/child relationship with other spans. A span may variously contain an associated transaction.id attribute that refers to their parent transaction; a parent.id attribute that refers to their parent span, or their transaction; a start time and duration; name; type; and optionally a stack trace.

Various embodiments provide a user interface which shows the distributed trace of all the components which took part in the transaction. Furthermore, various embodiments provide the user interface which string transactions together with a distributed trace in specific ways, integrated with ELASTICSEARCH or another analysis search engine, that enable navigating individual transactions for the various microservices to contextualize the performance of individual transactions and thereby quickly pinpoint bottlenecks of the end-user experience.

Figure 5:
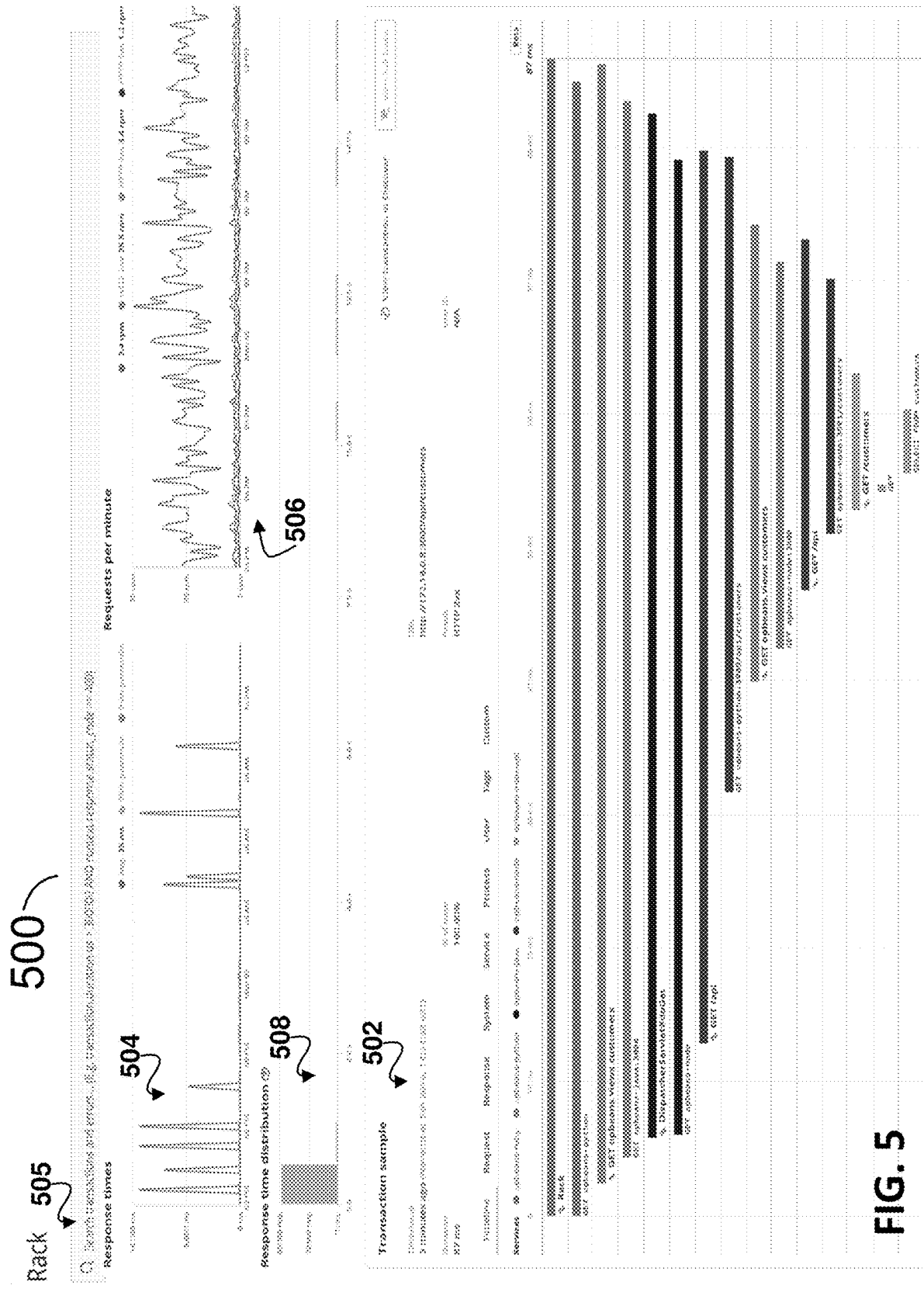
FIG. 5 is an example diagram illustrating an overall user interface that includes several aspects for the distributed trace and analysis integrated into a single view displayed to a user, according to some embodiments.

FIG. 5 is an example diagram illustrating an overall user interface (UI) 500 that includes several aspects for the distributed trace and analysis integrated into a single view displayed to a user.

In the example in FIG. 5, the aspects of the user interface include a transaction sample (timeline "waterfall") portion 502, response times graph 504, requests per minute graph 506, response time distribution graph 508, and a search field 505. The transaction sample timeline waterfall graph 502 (also referred to herein as the timeline waterfall or timeline waterfall graph) shows the services that were invoked to serve the request, e.g., services "opbeans-ruby", "opbeans-python", "opbeans-java", "opbeans-node" and "opbeans-node-api" in FIG. 5. As seen in the example in FIG. 5, some of the services can be invoked more than once to serve the incoming request. In this example, the response times graph 504 and the requests per minute graph 506 are shown over time, in real time. The response times graph 504 is show in this example with the slower response times on the right side and faster response time on the left side of a graph. In various embodiments, all of the graphs 502, 504, 506, and 508 and search field 505 are shown on a single view of the user interface. In some embodiments, one or more of the graphs may be separately shown on a UI.

Figure 5A:
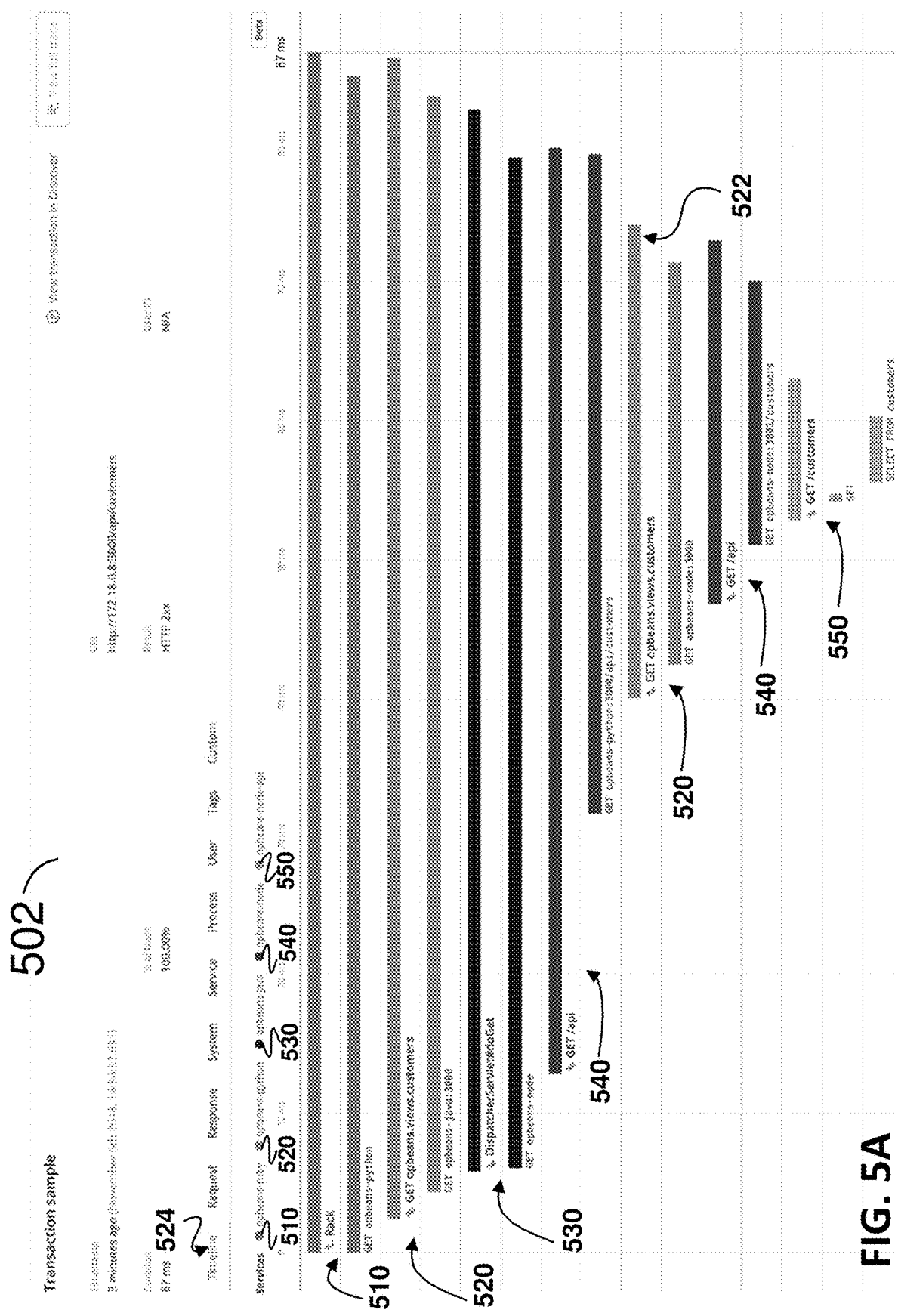
FIG. 5A illustrates the transaction sample (timeline waterfall) graph of the example in FIG. 5.

FIG. 5A shows the transaction sample (timeline waterfall) graph 502 of FIG. 5 separately for better clarity. The services in this example are identified as 510, 520, 530, 540, and 550 with seven service occurrences shown in the timeline where services 520 and 540 occur twice. Each of the services has multiple spans in this example. Span details can be shown in response to user selection of one of the spans in the timeline waterfall 502. The span details may include identification of the associated service, the time duration for the span, and a percentage (%) of the transaction that the particular span entails, and other details.

In some embodiments, the response times graph 504 shows response times for a user-selected service or span of the timeline waterfall 502. In response to the user selecting a particular service or span shown in the timeline waterfall 502, all or some of the other graphs (response times graph 504, response time distribution graph 508, and requests per minute graph 506) can show the information/metrics for the selected service or span.

Figure 5B:
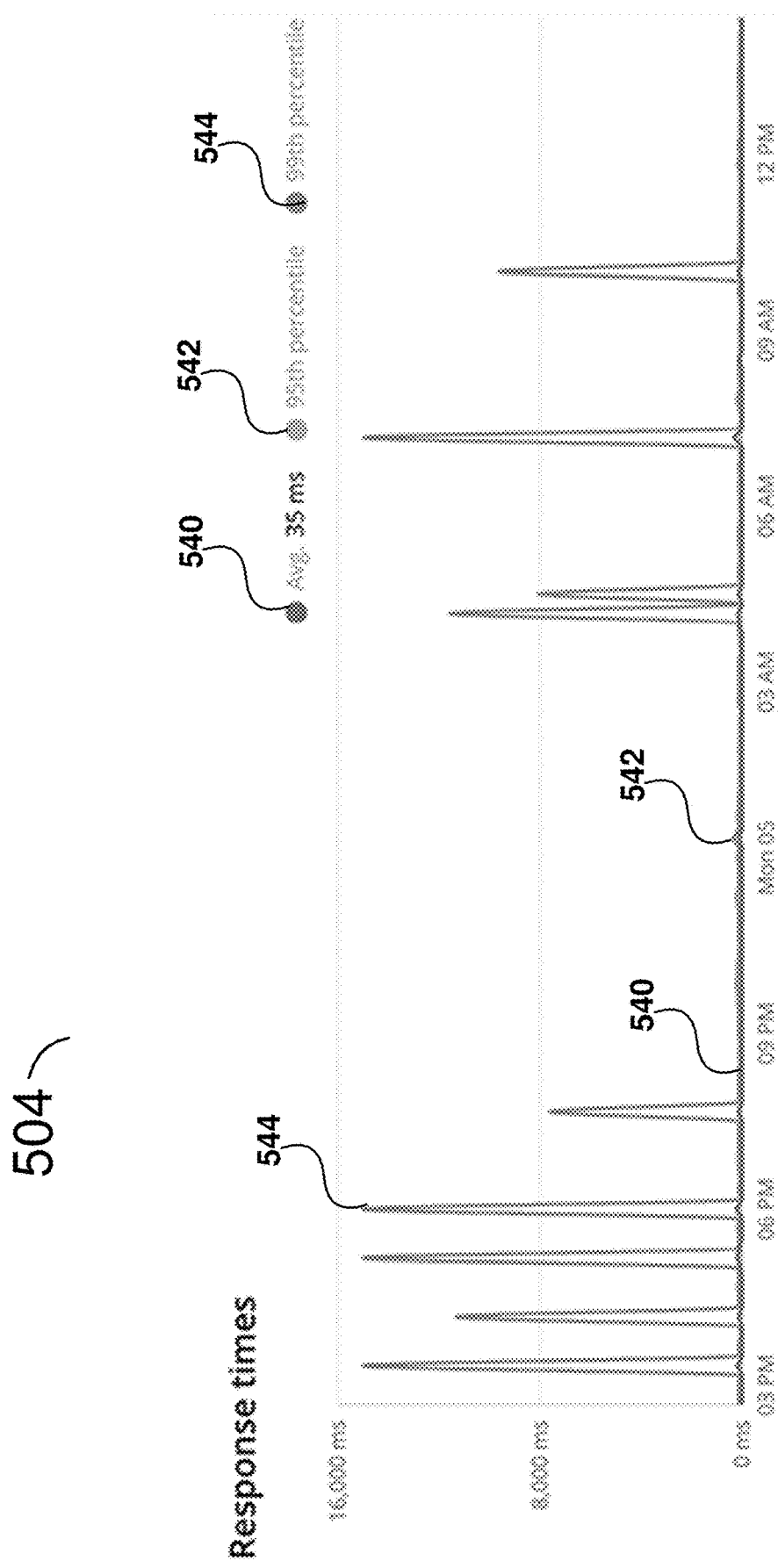
FIG. 5B illustrates the response times graph of the example in FIG. 5.

FIG. 5B shows the response times graph 504 of FIG. 5 separately for better clarity. In this example, response time are identified along the response times graph in the $99^{th}$ percentile at 544, $95^{th}$ percentile at 542, and average (e.g., 35 ms) at 540.

Figure 5C:
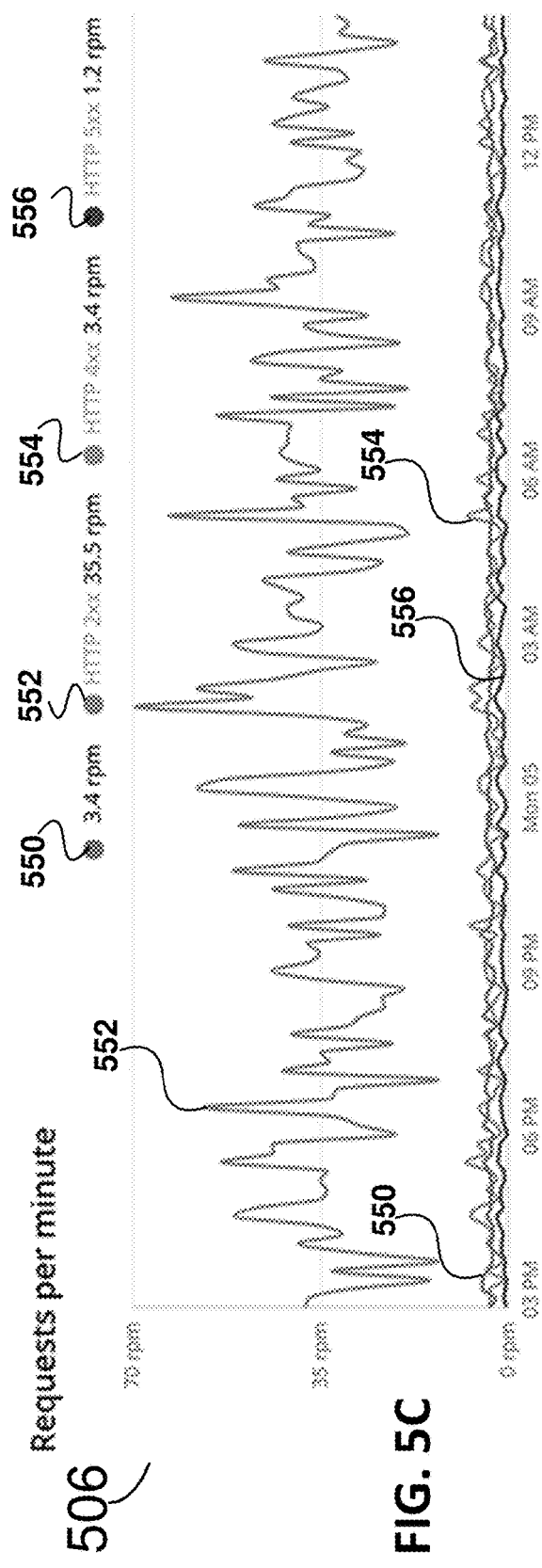
FIG. 5C illustrates the requests per minute graph of the example in FIG. 5.

FIG. 5C shows the requests per minute graph 506 of FIG. 5 separately for better clarity. In this example, requests per minute (rpm) are identified along the graph as 3.4 rpm (also identified as 550), 35.5 rpm (552), 3.4 rpm (554), and 1.2 rpm (556).

Figure 5D:
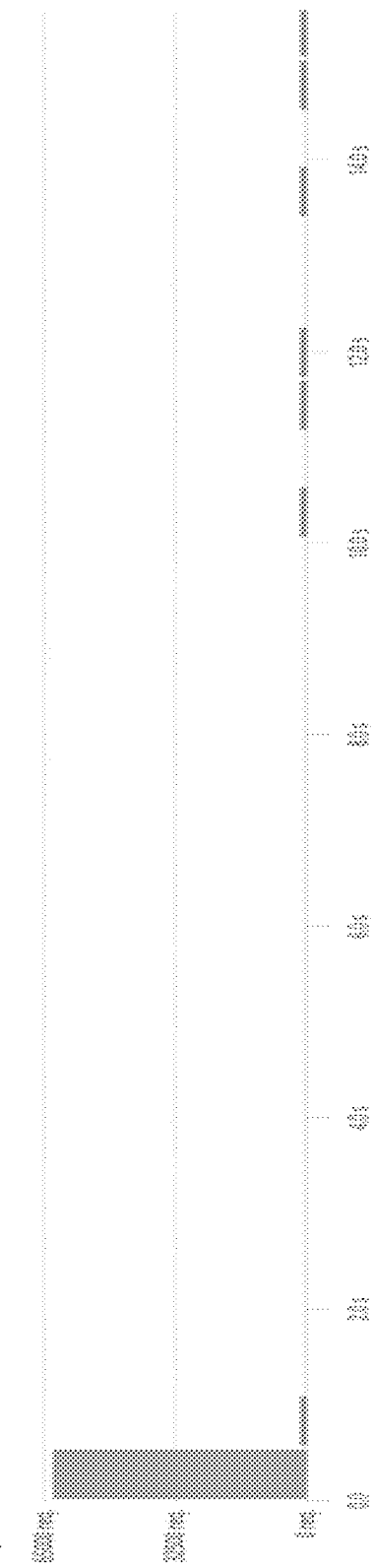
FIG. 5D illustrates the response time distribution graph of the example in FIG. 5.

FIG. 5D shows the response time distribution graph 508 of FIG. 5 separately for better clarity. In this example, the response time distribution graph 508 is shown as a histogram. As can be seen in this example, the vast majority of the traces are bucketed on the left side indicating fast response times with the slower response times on the left side. The slowest response time being on the end of the graph which aids a user/developer in visualizing where a response time bottleneck may be and which trace and service is the cause. To aid in the debugging process, each element in the response time distribution graph 508 is selectable. For example, if the slowest response time part of the histogram is selected, in response to the selection, the transaction sample waterfall 502 would change to show traces for the services and spans associated with that slowest response time.

In the example in FIG. 5A, the spans are provided in a waterfall-type breakdown visualization (see also high level example in FIG. 4). In the example in FIG. 5A, the top four spans (identified at 510) are for a first service, the next four spans (identified at 520) are for a second service, the next two spans (identified at 530) are for a third service and so on. This interface can enable a user to readily identify a span that, for instance, has the longest duration as a way of looking for spans and/or services that took the longest time.

For example, a user can select span 522 of service 520 among the spans for the third service where the UI indicates that span is taking too long. In response to the selection, various aspects (e.g., response times, requests per mine, response time distribution, etc.) can be shown just for that span 522, in order to enable the user to identify which part of the transaction was the cause of that slow down. For the initial select, the user may initially identify a span as taking too long based on seeing the visualization and traces and in some embodiments, based further on knowledge of history for the particular service, based on machine learning, or other methods. The method in various embodiments collates the results and spans from these different services (e.g., microservices) together into a transaction and is able to have that data as an entity for which reports can be provided (e.g., response times, response time distribution, request per minute, etc., see examples in FIGS. 5, 5B, 5C, and 5D.)

As can be seen in the foregoing examples, the distributed tracing strings together the various service for a web request. The associated visualizations and traces provided by various embodiments enable a user to diagnose the problem.

Referring to FIG. 4, in various embodiments, the method automatically propagates a unique ID from the incoming requests that hits service 1 (418) down to service 2 (413) and down to service 3 (422) in this example. So, it can be readily identified that service 3 (422) was actually initiated at service 1 (418) then service 2 (413) and then finally service 3 (422) because the method is propagating this unique ID all the way from service 1 (418) to service 3 (422).

In various embodiments, the response time distribution graph 508 in FIG. 5A and FIG. 5D provides a distribution graph that will show fast times at the left and slow ones at the right, allowing developers and other users to visualize what a normal response time looks like and what the breakdown between the services normally looks like. The user interface can enable a user to look at a very slow trace, select that trace and see what the UI for that particular trace will look like. Each of the spans can be considered to be basically a breakdown of what that particular service was spending its time on, the time being something the API agents automatically instrument. The method according to various embodiments give a developer or other user added levels of insight on the service level regarding what the service is spending its time on.

The APM agent can reside inside of the user's applications, when a request coming into one of those applications (e.g., in response to a request coming into one of those applications), the respective APM agent will look for a unique trace ID in the incoming HTTP header.

If there is no ID, the APM agent can generate one and then pass that on.

In various embodiments, the ID will attach to that trace that new unique trace ID to any traces, spans, and services associated with the ongoing request. A following service may get the incoming request and a trace ID in the HTTP header which signals that the two services are linked. Thus, in various embodiments, there is one service that the method causes to initiate the trace ID because it is the very first service that received the request, and then the method causes the first service to propagate that ID to a number of following services.

By propagating this user ID to dozens of different services, various embodiments link them all together and can show the spans for each one, the time for each one and enables a user to visualize this and determine there is a problem (e.g., an operation is taking too long).

If generic visualization tools were used for looking at data, in ELASTICSEARCH for example, it would be very difficult to visualize and pinpoint bottlenecks and other issues. Various embodiments provide the unique visualizations, distributed tracing, data and overall functionality desired.

The response time distribution, such as in the examples in FIGS. 5 and 5D, can for instance show that certain code is taking 95% of the entire execution time. Providing an interface where a user can see the difference between a normal fast trace and a very slow anomalous trace in real time can provide the user with a very valuable and time saving visualization in real time.

In various embodiments, there is no technical limit to the number of services (and transactions within a service) that the user interface can handle.

Various metadata is automatically picked up by the APM agents, for instance, the HTTP header which sometimes contains user agent and other information that is helpful for debugging. For example, for whatever reasons a trace may be only slow when people are using a SAFARI browser as opposed to a CHROME browser. A user will be able to see the associated metadata (at tabs, for instance) in various embodiments of the methods and systems. In particular web use cases, a user can attach their own metadata. For web use cases, for example, it can often be very useful to have a software version as part of the metadata. The reason is that when a developer updates the code they want to be able to differentiate that performance data from, for example, version 3 to version 4 of the software.

In some embodiments, the method and systems provide for the UI to enable the user to filter down by certain metadata, by a certain label. For example, if the user only wants performance data (response times, response time distribution, etc.) for version four of their software, the user interface enables selection of that metadata to enable filtering by version. The filtering can be via the search field 505 in the UI 500 in the example in FIG. 5. For clarity given all the detail, not all of the browser screen is shown in FIG. 5, just a portion of the UI 500. That is, UI 500 in this example is part of a browser screen where search field 505 can be used to search using particular fields or metadata, e.g., transaction.duration.us>300000 AND context.response.status_code>=400).

Another metadata example involves attaching a user ID as metadata. For example, if customer support receives a complaint from a big customer about performance, the user can use the UI according to various embodiments to filter all the data down by the big customer's user ID (e.g., in the search field 505) and then confirm that customer had slow experiences; and then debug why that occurred using the UI, graphs, and data it provides and fix the problem. A user can add whatever is relevant to their particular application that is available to express as metadata. Searching can then be formed based on the metadata, and then view the distributed traces services, span and transaction information, and view response times, requests per minute, and response time distribution that may also be provided on the UI in order to pinpoint the problem, e.g., pinpoint for a particular customer user ID, as described further herein. Filtering could be by other metadata, as described above, such as by user name, e.g., context, user.username:"cseggeff" in the search field.

Further regarding the timeline, see "Timeline" on the UI identified at 524 for the waterfalled timelines shown in the example in FIG. 5A. It may not be assured that the time that different services uses is the same, so it might not be guaranteed that the time is synchronized between the servers running different services, for instance. Thus, when data is received from different services and a UI tries to draw them nicely linked together along a timeline, as shown nicely linked in FIG. 5A for instance, it is not guaranteed that the time that the services record can be used. Various embodiments address this by a process that make sure the services are linked inside one another, and if the times provided do not fit properly, a determination is made to detect whether there is a difference in timestamps that the services used. By using the timestamp data, a determination can be made in various embodiments of how to nest the traces for the various services, with an example result as shown in FIG. 5A (and at a high level in FIG. 4). For example, if based on some data from different service, a child span would start before a parent's span, various embodiments determine that there is clock skew such that the clocks of the associated servers are not aligned, since a child span can never be stopped before its parent. If that occurs, the method can move the child span so that it fits is only to start after the parent span started. As part of the linking, a parent's span ID may be generated as part of the trace ID, to indicate, for a parent that is part of the trace ID, that the child is also part and should be linked. So for each span, for example, span 522 in FIG. 5A, the parent would be known.

FIG. 6 illustrates version, trace id, parent span id, and flags (sampling) where the trace id, (trace ID) may be standardized. APM agents create and propagate unique trace IDs via HTTP headers. A W3C Trace Context working group is working on standardizing the HTTP header format for distributed tracing. When implemented, this can standardize the HTTP header across all tracing vendors. The W3C Trace Context is not yet finalized. Various embodiments closely follow the W3C Trace Context draft specification. For the Trace Context draft specification, a trace can be fully recorded even though there are not APM agents for all of the services used, e.g., for external services that are controlled by the user, where the external services conform to the Trace Context draft specification. For an example embodiment 600, the confirming external service can be, for example, a payment processing provider. Although the user does not control the code base of the payment processing provider, it may need to be called (invoked) as part of serving a request. If the payment processing provider supports the standardized HTTP header, the trace for the payment processing can be part of the distributed trace since the third party (such as the payment processor provider) would support reading the trace ID and passing the trace ID forward down to services that the user does control. So, in some embodiments, the services internal and external can all be linked together in the distributed trace where the external service conforms to a standard, for example, at least the Trace Context draft specification of the standard.

FIG. 7 is a simplified flow diagram of a method 700, according to an example embodiment. Operation 702 includes providing a user interface (UI) including a distributed trace indicating in real time a plurality of services invoked to serve an incoming request, the UI further including associated execution times for the plurality of services, the distributed trace linking in real time each of the plurality of services to one another over time, as described further herein.

Operation 704 includes further providing in the UI one or more spans over time for each of the plurality of services, the spans including information about a particular code path executed for the respective one of the plurality of services, as described further herein.

In operation 706, providing in the user interface response time information associated with the distributed trace for serving the request, as described further herein.

Figure 8:
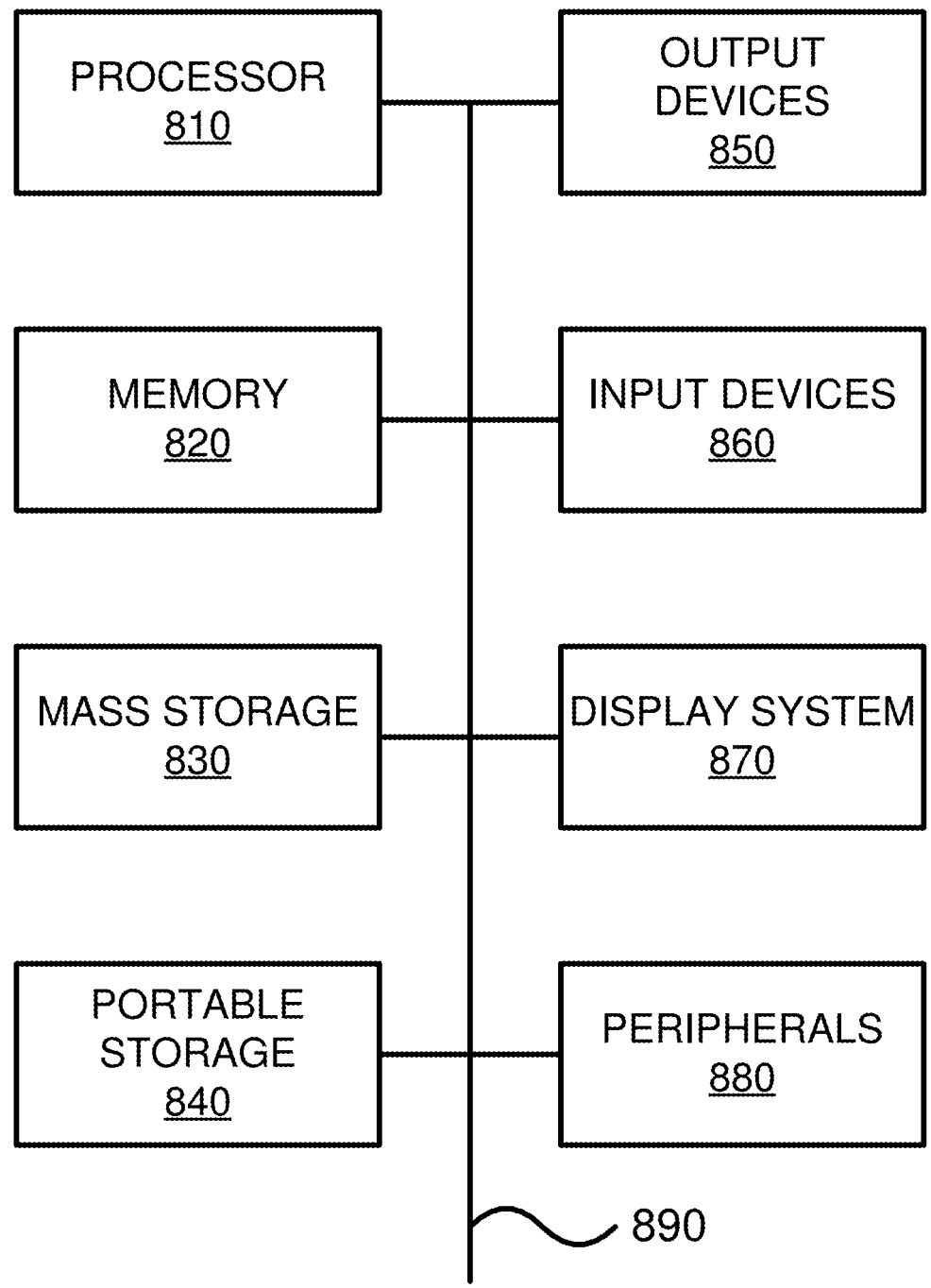
FIG. 8 is a simplified block diagram of a computing system, according to some embodiments.

FIG. 8 illustrates an exemplary computer system 800 that may be used to implement some embodiments of the present invention. The computer system 800 in FIG. 8 may be implemented in the contexts of the likes of computing systems, networks, servers, or combinations thereof. The computer system 800 in FIG. 8 includes one or more processor unit(s) 810 and main memory 820. Main memory 820 stores, in part, instructions and data for execution by processor unit(s) 810. Main memory 820 stores the executable code when in operation, in this example. The computer system 800 in FIG. 8 further includes a mass data storage 830, portable storage device 840, output devices 850, user input devices 860, a graphics display system 870, and peripheral device(s) 880.

The components shown in FIG. 8 are depicted as being connected via a single bus 890. The components may be connected through one or more data transport means. Processor unit(s) 810 and main memory 820 are connected via a local microprocessor bus, and the mass data storage 830, peripheral device(s) 880, portable storage device 840, and graphics display system 870 are connected via one or more input/output (I/O) buses.

Mass data storage 830, which can be implemented with a magnetic disk drive, solid state drive, or an optical disk drive, is a non-volatile storage device for storing data and instructions for use by processor unit(s) 810. Mass data storage 830 stores the system software for implementing embodiments of the present disclosure for purposes of loading that software into main memory 820.

Portable storage device 840 operates in conjunction with a portable non-volatile storage medium, such as a flash drive, floppy disk, compact disk, digital video disc, or Universal Serial Bus (USB) storage device, to input and output data and code to and from the computer system 800 in FIG. 8. The system software for implementing embodiments of the present disclosure is stored on such a portable medium and input to the computer system 800 via the portable storage device 840.

User input devices 860 can provide a portion of a user interface. User input devices 860 may include one or more microphones, an alphanumeric keypad, such as a keyboard, for inputting alphanumeric and other information, or a pointing device, such as a mouse, a trackball, stylus, or cursor direction keys. User input devices 860 can also include a touchscreen. Additionally, the computer system 800 as shown in FIG. 8 includes output devices 850. Suitable output devices 850 include speakers, printers, network interfaces, and monitors.

Graphics display system 870 include a liquid crystal display (LCD) or other suitable display device. Graphics display system 870 is configurable to receive textual and graphical information and processes the information for output to the display device. Peripheral device(s) 880 may include any type of computer support device to add additional functionality to the computer system.

Some of the components provided in the computer system 800 in FIG. 8 can be those typically found in computer systems that may be suitable for use with embodiments of the present disclosure and are intended to represent a broad category of such computer components. Thus, the computer system 800 in FIG. 8 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including MAC OS, UNIX, LINUX, WINDOWS, PALM OS, QNX, ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 800 may be implemented as a cloud-based computing environment, such as a virtual machine operating within a computing cloud. In other embodiments, the computer system 800 may itself include a cloud-based computing environment, where the functionalities of the computer system 800 are executed in a distributed fashion. Thus, the computer system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 800, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, nonvolatile media, volatile media and transmission media. Non-volatile media include, e.g., optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, e.g., a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as PYTHON, JAVASCRIPT, JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for providing distributed tracing for application performance monitoring in a microservices architecture, the method comprising:
    providing a user interface including a distributed trace indicating in real time a plurality of services invoked to serve an incoming request, the user interface further including associated execution times for the plurality of services, the distributed trace linking in real time each of the plurality of services to one another over time;
    further providing in the user interface one or more spans over time for each of the plurality of services, the one or more spans including information about a particular code path executed for a respective one of the plurality of services, the one or more spans comprising a breakdown of what the respective one of the plurality of services was spending its time on, the one or more spans measuring from start to end of a certain activity;
    providing in the user interface response time information associated with the distributed trace for serving the incoming request, wherein the response time information is based on data from at least one application performance monitoring (APM) agent, the at least one APM agent configured to instrument code and collect performance data and errors at runtime;
    providing for the user interface to enable selection by a user of each of the one or more spans; and
    in response to the selection, providing in the user interface details regarding the selected span comprising at least two of an identification of a service associated with the selected span, a time duration of the selected span, and a percentage of a transaction that the selected span entails.

2. The computer-implemented method of claim 1, wherein the incoming request comprises an incoming HTTP request.

3. The computer-implemented method of claim 2, wherein the distributed trace is for one or more transactions that are events captured by a plurality of application monitoring agents, the plurality of application monitoring agents automatically instrumenting the application and automatically collecting performance metrics on the incoming HTTP request in real time and storing the performance metrics as documents in the indices of a search engine, the search engine being a distributed search engine for searching within a particular website, the search engine being other than for searching across multiple websites having multiple domains across the public Internet.

4. The computer-implemented method of claim 1, further comprising:
    determining if the incoming request includes a trace ID; and
    if the incoming request does not include any trace ID, assigning a trace ID to the incoming request.

5. The computer-implemented method of claim 4, further comprising:
    associating the trace ID with a first, in time, service of a plurality of services invoked for serving the incoming request; and
    propagating the trace ID from the first service to each successive, in time, ones of the plurality of services that are invoked for serving the incoming request.

6. The computer-implemented method of claim 5, wherein the propagating comprises causing associating the trace ID with the successive ones of the plurality of services and respective one or more spans for each of the successive ones of the plurality of services invoked for serving the incoming request.

7. The computer-implemented method of claim 1, wherein the user interface provides the distributed trace graphically in real time in a timeline waterfall form.

8. The computer-implemented method of claim 5, wherein the incoming request is an incoming HTTP request having a header format standardized regarding the trace ID, the method further comprising:
    for each back-end service, of the plurality of services, that conforms to the standardized trace ID, providing in the distributed trace timing information regarding each of the back-end services that are part of servicing the incoming request.

9. The computer-implemented method of claim 8, wherein the incoming HTTP request includes a query and one of the back-end services is invoked to process the query by obtaining search results for web sites across the Internet.

10. The computer-implemented method of claim 1, wherein, for the distributed trace, the user interface shows execution times for the plurality of services represented by a horizontal bar of a color assigned to each of the plurality of services, each of the plurality of services and associated one or more spans being presented in a different color.

11. The computer-implemented method of claim 1, further comprising:
    providing a search field in the user interface; and
    receiving input from a user in the search field, the user input in the search field being for filtering at least some of the timing information based on certain metadata.

12. The computer-implemented method of claim 11, wherein the metadata includes at least a version of software for at least one of the plurality of services, such that debugging between versions of the software is enhanced.

13. The computer-implemented method of claim 1, further comprising for the linking in real time of each of the plurality of services to one another over time, if times provided from successive ones of the plurality of services do not align properly, detecting a difference in timestamp data for the successive ones of the plurality of services, based on the difference, nesting individual traces for the successive ones of the plurality of services in the distributed trace.

14. The computer-implemented method of claim 13, wherein the not aligning is due to clock skew indicating that a child span of the one or more spans stops before a respective parent span of the one or more spans.

15. The computer-implemented method of claim 4, further comprising, for a trace ID of the incoming request, the linking including generating a parent span ID as part of the trace ID.

16. The computer-implemented method of claim 1, wherein the user interface provides in a single view the response time information which comprises:
    a graph of response times for each of the plurality of services over time; and
    a graph of a distribution of the response times over time for each of the plurality of services.

17. The computer-implemented method of claim 1, wherein a graph of the response time information distribution is presented as a histogram having elements over time for the one or more spans, the elements of the histogram being selectable by a user, and in response to selection by the user of a part of the histogram, providing timing details regarding a span of the one or more spans associated with the user selection.

18. The computer-implemented method of claim 16, wherein the user interface presents a single view that, in addition to the other graphs, further includes a graph of requests per minute, and a search field for searching via metadata.

19. A system comprising:
    a processor; and
    a memory communicatively coupled to the processor, the memory storing instructions executable by the processor to perform a method, the method comprising:
      providing a user interface including a distributed trace indicating in real time a plurality of services invoked to serve an incoming request, the user interface further including associated execution times for the plurality of services, the distributed trace linking in real time each of the plurality of services to one another over time;
      further providing in the user interface one or more spans over time for each of the plurality of services, the one or more spans including information about a particular code path executed for a respective one of the plurality of services, the one or more spans comprising a breakdown of what the respective one of the plurality of services was spending its time on, the one or more spans measuring from start to end of a certain activity;
      providing in the user interface response time information associated with the distributed trace for serving the incoming request, wherein the response time information is based on data from at least one application performance monitoring (APM) agent, the at least one APM agent configured to instrument code and collect performance data and errors at runtime;
      providing for the user interface to enable selection by a user of each of the one or more spans; and
      in response to the selection, providing in the user interface details regarding the selected span comprising at least two of an identification of a service associated with the selected span, a time duration of the selected span, and a percentage of a transaction that the selected span entails.

20. A computer-implemented method for providing distributed tracing for application performance monitoring in a microservices architecture, the method comprising:
    providing a user interface including a distributed trace indicating in real time a plurality of services invoked to serve an incoming HTTP request by an application, the user interface further including associated response time information associated with each of the plurality of services;
    further providing in the user interface one or more spans over time for each of the plurality of services, the one or more spans including information about a particular code path executed for a respective one of a plurality of services, the one or more spans comprising a breakdown of what the respective one of the plurality of services was spending its time on, the one or more spans measuring from start to end of a certain activity;
    associating a trace ID of the incoming HTTP request with a first, in time, service of a plurality of services invoked for serving the incoming HTTP request;
    propagating the trace ID from the first service to each successive, in time, ones of the plurality of services that are invoked for serving the incoming HTTP request, such that the distributed trace links in real time each of the plurality of services to one another over time including the spans for each of the plurality of services; and
    providing in the user interface a search field for receiving user input for filtering based on particular metadata, and based on the user input, automatically filtering at least some of the timing information based on certain metadata and automatically presenting the filtered at least some of the timing information on the user interface, wherein the timing information is based on data from at least one application programming monitoring agent.

21. The computer-implemented method of claim 20, wherein the metadata includes a user ID associated with a customer of a user, such that the user interface and timing information is filtering down by the customer's user ID.

22. The computer-implemented method of claim 1, wherein the one or more spans further comprise:
    an associated transaction.id attribute that refers to their parent transaction;
    a parent.id attribute that refers to their parent span or their transaction;
    a start time and a duration;
    a name;
    a type; and
    a stack trace.

* * * * *